May 1, 1928.

C. F. KETTERING 1,668,508

PROCESS OF MAKING AIR COOLED CYLINDERS

Original Filed Nov. 9, 1921     5 Sheets-Sheet 1

Fig. 1

Inventor
Charles F. Kettering
By Spencer, Sewall, & Hardman,
His Attorneys

C. F. KETTERING

PROCESS OF MAKING AIR COOLED CYLINDERS

Original Filed Nov. 9, 1921    5 Sheets-Sheet 4

Inventor
Charles F. Kettering
By Spencer, Sewall, & Hardman
His Attorneys

Patented May 1, 1928.

1,668,508

UNITED STATES PATENT OFFICE.

CHARLES F. KETTERING, OF DAYTON, OHIO, ASSIGNOR TO GENERAL MOTORS RESEARCH CORPORATION, OF DAYTON, OHIO, A CORPORATION OF DELAWARE.

PROCESS OF MAKING AIR-COOLED CYLINDERS.

Original application filed November 9, 1921, Serial No. 514,014. Divided and this application filed October 29, 1923. Serial No. 671,490.

This invention relates to the manufacture of products composed of different metals integrally bonded together, and more particularly to the manufacture of air-cooled cylinders for internal-combustion engines or the like, wherein heat-dissipating elements of a relatively high heat-conducting metal are caused to cohere to ferrous or other metallic cylinders of relatively low heat conductivity, thus forming an integral heat-transfer unit of high efficiency.

This application is a division of application Serial No. 514,014, for internal-combustion engines, filed Nov. 9, 1921, which is a continuation in part of application Serial No. 392,646, filed June 29, 1920.

Objects of the invention are the production of an air-cooled engine cylinder having heat-dissipating elements composed of a metal of higher heat conductivity than the cylinder, integrally bonded to the cylinder in a manner to provide a continuous molecular path of metal to conduct heat from the cylinder into the heat-dissipating elements; the production of a cylinder or the like, having said heat-dissipating elements formed as part of a continuous sheet of high heat-conducting metal integrally bonded to the cylinder; and the formation of such cylinders with heat-dissipating elements of extensive surface and the largest and easiest path practicable for conducting heat from the cylinder.

The invention consists in the process, hereinafter described and claimed, whereby heat-dissipating elements of small thickness and large heat-dissipating area may be integrally bonded to a body of relatively low heat conductivity, in such manner as to provide an extensive uninterrupted molecular path of metal for the free conduction of heat between the said body and said elements.

In the accompanying drawings, in which like reference characters indicate like parts throughout the several views,—

The construction of engine and engine cylinder will best be understood by first describing the structure of the heat-dissipating elements or fins and cylinder shell and then the method of attaching the fins to the cylinder shell. For the purpose of comprehending more clearly the description which follows, reference should be had to Figs. 1, 2 and 3 of the drawings, which show the heat dissipating or finning structure 31 and the cylinder shell 30, to which said finning structure is to be attached, said shell having a flange 30ª by which it may be secured to a base such as an engine crank case.

In order to facilitate the attachment of the fins to the shell, to secure uniformity of attachment, to save labor and secure other advantages, I prefer to form some or all of the fins of a strip of copper or other high heat-conducting metal, bent or crimped to the shape of the fins, and in the embodiment here illustrated I have shown all the fins made from a continuous thin strip of metal so that there will be a large number of fins which will be attached to the cylinder simultaneously and under uniform treatment; that is, each fin is subjected to substantially the same condition as all the other fins in the process of attaching the fins to the shell. These fins may be made of substantially pure metallic copper which is preferably of uniform gauge, and while the thickness of the copper depends upon the type of engine upon which it is employed and other factors, I prefer for installation on the engine of an ordinary passenger car, to use a thin sheet of copper. In actual practice, copper strips ranging from thirteen to eighteen thousandths of an inch have given good results in automobile engines.

Figure 5:
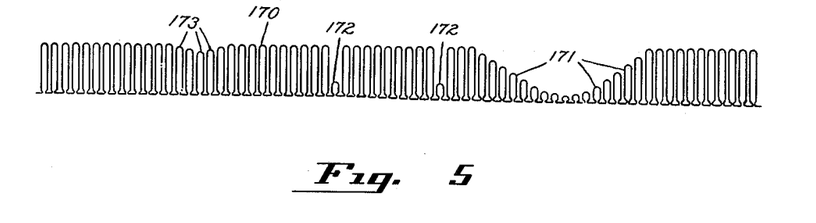
Fig. 5 shows one form of the finning structure.
Figure 9:
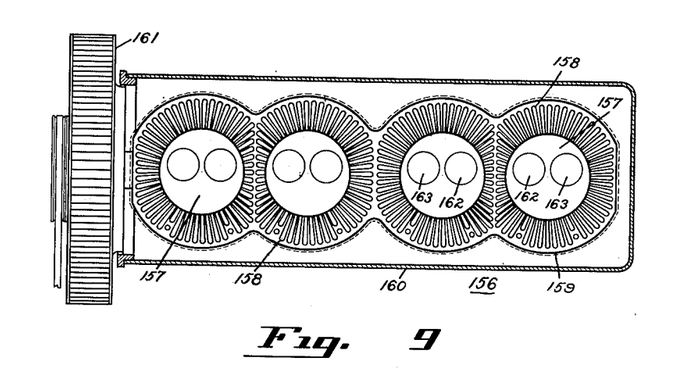
Fig. 9 is a plan view partly in section of an engine made in accordance with the invention.
Figure 10:
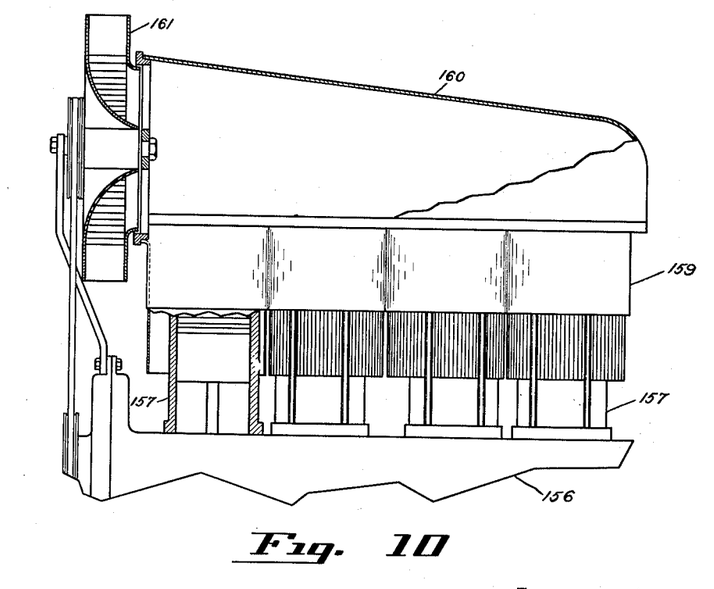
Fig. 10 is a side view of the engine shown in Fig. 9 partly in section.

The heat-dissipating or finning structure illustrated in Figs. 1, 2, 3, 6 and 7 provides a number of uniform radial fins spaced equidistant and arranged with their outer edges concentric with the periphery of the shell; for convenience, this type of finning structure will be referred to hereinafter as concentric finning. The fins need not be uniform, however, and in another form of the invention which is illustrated in Figs. 5, 9 and 10, the cylinder is provided with fins of varying height (that is, radial extent beyond the cylinder shell) in order that cylinders of an engine may be placed more closely together and space be provided for certain of the working members such as valve push rods which would otherwise be obstructed by the fins; the finning structure, when assembled on the cylinder, may present an external configuration which is eccentric with respect to the periphery of the shell, notwithstanding the fact that the bases of the fins are concentric with and attached to the shell. The invention will first be described with reference to the attachment of an externally concentric finning structure to the shell, and thereafter with reference to the attachment of a finning structure which is not externally concentric.

Referring first to Figs. 1, 2, 3, 6 and 7, it will be seen that the finning structure consists of a plurality of fin loops, 32, each loop including two fin portions 320 exposed on both sides to cooling air, and of base portions 33 connecting the loops 32. The distance from the base of a fin to the outer edge of the fin, is hereinafter referred to as the height of the fin, and the distance from the top edge of the fin to the bottom edge of the fin in a longitudinal direction being referred to as the length of the fin. By referring to Fig. 3, it will be noticed that the fins are shorter than the length of the cylinder and it is desired to have them embrace the cylinder more particularly around the upper zone of the cylinder which becomes hottest in the operation of the engine. By curving the fins circumferentially around the cylinder in the manner illustrated in Fig. 1, it will be noticed with reference to Fig. 3, that the bases of successive fins are contiguous to each other, thus forming approximately a circular cylinder, and the flexibility of the metal sheet is such that the base portions 33 can conform to the periphery of the cylinder when the fins are pressed against the cylinder shell in the manner more particularly hereinafter described. It will thus be obvious that the bases 33 of the fins, edge to edge, at this stage in the process of manufacture, form a substantially circular cylindrical surface broken at the points where fins 320 formed by the sides of the loops 32 extend outwardly from the bases thereof. The provision of these bases of relatively large area is important because it insures good face contact between the base of the finning structure and the bonding metal as hereinafter described, thus providing a maximum surface for attachment and insuring both mechanical strength and efficient heat-conducting capacity.

The process of attaching the finning structure to the shell may for purpose of convenience be divided into a number of steps, although it will be obvious that some of these steps may be combined and modified without departing from the invention. The preferred process of the invention involves 1. Forming the finning structure.
2. Preparing the finning structure for fluxing.
3. Fluxing the finning structure.
4. Preparing the cylinder for fluxing.
5. Fluxing the cylinder shell.
6. Assembling the fins, bonding metal, and cylinder.
7. Fluxing the assembly.
8. Brazing operation.
9. Removal of flux and finishing.

I will now proceed to describe the preferred process of manufacture step by step including the brazing operation both in a gas furnace and in an electrical furnace, both of which have been employed with success. A machine for manufacturing the finning structure forms the subject matter of patent to C. L. Lee, No. 1,507,318, and in itself is no part of the present invention except in so far as it is used in the process of manufacturing engine cylinders in accordance with the present invention.

*1. Forming the finning structure.*

Figure 4:
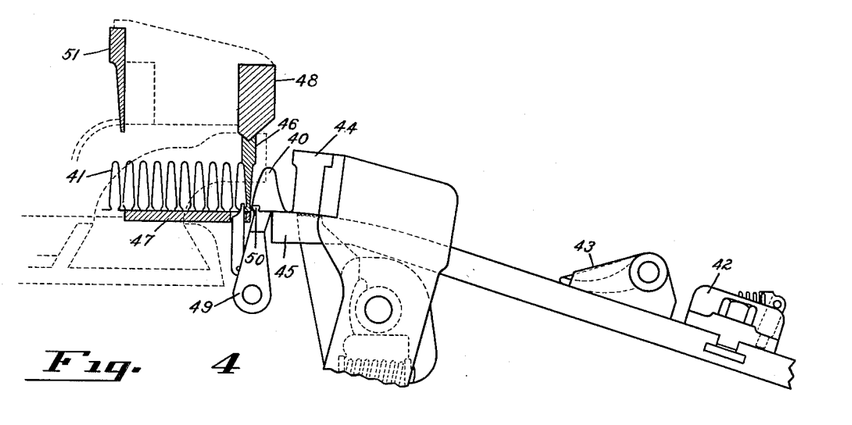
Fig. 4 is a diagrammatic view showing the operation of a machine which pleats or folds a thin metallic sheet to make a strip of finning structure.

In order that the formation of the sheet copper into the finning structure may be better understood, the operation of the machine referred to is illustrated diagrammatically in Fig. 4. The copper employed is preferably pure, and in practice I prefer to use a sheet copper which is 99.85% pure copper. Care should be taken that the copper is of uniform gauge, so that when the predetermined number of fins have been formed, the finning structure will be exactly the correct dimensions to extend substantially exactly around the cylinder.

In Fig. 4 the sheet metal is indicated at 40 and is shown as having been formed into a series of folds indicated at 41. The metal will be supplied from a suitable roll which in the present form of machine is supported by some exterior roll holder (not shown) and is fed from the right hand of this mechanism through guides 42, under the grip or clamp 43 under the head of the ram 44, and as indicated, over the apron or platform 45.

When the machine is in operation, the matrix 46, occupies the position shown in this figure, being secured in place against the top plate 47, by means of the clamp 48, and as the ram 44 moves over the apron 45, towards matrix 46, the grips upon the ram fasten upon the sheet 40 and cause it to buckle between the face of the ram and the matrix 46 whereupon the base forming element 49 is lifted to the position shown to allow the small bead 50 to project up above the upper plane of the apron 45 and come between the matrix 46 and the face of the ram, in order to form the base portion 33 connecting the folds. By the time the base forming element 49 has been lifted into position, the face of the ram forces the sheet of metal against the matrix 46 and the bead 50, forming a fold such as indicated at 41.

As soon as the ram starts upon its first return or releasing movement the base forming element 49 drops below the apron 45. The ram then moves forward to complete the forming of the fold, after which it returns to its original or outermost position. A second matrix, of the same contour as the first matrix 46, moves forward and slides in front of the first matrix and the newly formed fold. Before the second matrix has completed its travel in front of the first matrix, the clamp 48 operates to release this first matrix and these two matrices move to the left a distance of the width of a fold, carrying therewith the sheet material and folds. The second matrix then completes its movement in front of the first matrix, occupying the former position of matrix 46 so that the ram may repeat its operation on the material to form another fold.

When a suitable number of folds have been formed by the several operations just described, the strip is cut by means of a knife illustrated at 51.

*2. Preparing the finning structure for fluxing.*

After the finished strip of fins has been cut off to the proper length and leaves the finning machine, it is cleaned preferably by dipping it in caustic soda and then dipping in a nitric acid bath—commercial nitric acid; then washing it; then dipping it in cyanide to neutralize the nitric acid; then washing it with a brush and then dipping it in hot water. The fins are then ready for the first fluxing operation. The various steps of cleaning and dipping to which this strip of fins is subjected after it leaves the finning machine may be modified in a manner obvious to those skilled in the art, the purpose of this treatment being to get the copper fins in the desired clean condition for securing the most satisfactory bond between the copper and the other metals in the brazing operation.

*3. Fluxing the finning structure.*

A suitable flux is applied by a brush or other suitable means on the under surface of the bases 33 of the fins, which surface comes into contact with the brass used in the brazing operation. The flux which has been found to give the best results in practice consists of a mixture of borax and boric acid. It is preferred to use a composition composed of one part by weight of borax, one part by weight of boric acid and eight parts by weight of water. The flux is applied hot and preferably at a temperature of about boiling point. Care should be taken not to use too thick a flux. The flux should also be uniformly applied, and by applying it in liquid form, it is evenly distributed on the surface of the metal, thereby assisting in securing a uniform bonding. The flux may be permitted to dry, or specially dried prior to the assembling. In order to distinguish this fluxing operation of the fins from a second fluxing operation hereinafter described, this operation may be referred to as the first fluxing, and the flux employed may be referred to as the thin flux in order to distinguish it from the flux used in the second or heavy fluxing.

*4. Preparing the cylinder for fluxing.*

The iron cylinder to which the copper fins are to be attached is made by the usual casting operation or in any other suitable way and the outer face of the cylinder is given a smooth finish, as by grinding, cutting or any other suitable operation which will remove any obstructions or scale on the outer face of the cylinder, and will give it an even bearing surface for the brazing metal and fins when applied as hereinafter described. It has been found advantageous after this surface has been thus prepared, to electroplate the outer surface of the engine cylinder with copper (usually a light coating) which electroplating is done in any usual manner. In addition to other desirable effects, this plating prevents oxidation of the outer surface of the engine cylinder, so that if a considerable period of time elapses between the time when the cylinder is conditioned for assemblage, and the actual assembling operation, there is no problem of removing oxidation as would be the case with a cylinder not provided with this protecting coating of electroplated copper.

5. *Fluxing the cylinder shell.*

After the electroplating operation, the cylinder is ready for fluxing and the outer surface of the cylinder is suitably coated as for instance by means of a brush, with a suitable flux, which is preferably the same kind of flux, (viz, a thin flux) that is used on the surface of the bases 33 of the fins and described above with reference to the fluxing of the finning structure. This flux is also permitted to dry or suitably dried prior to the assembling operation.

6. *Assembling operation.*

Figure 1:
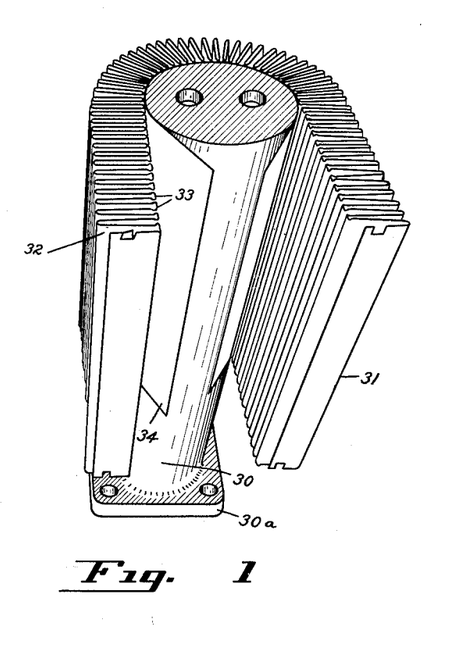
Fig. 1 is a perspective view illustrating the method of assembling a continuous strip of finning material and a brazing material around a cylinder.
Figure 2:
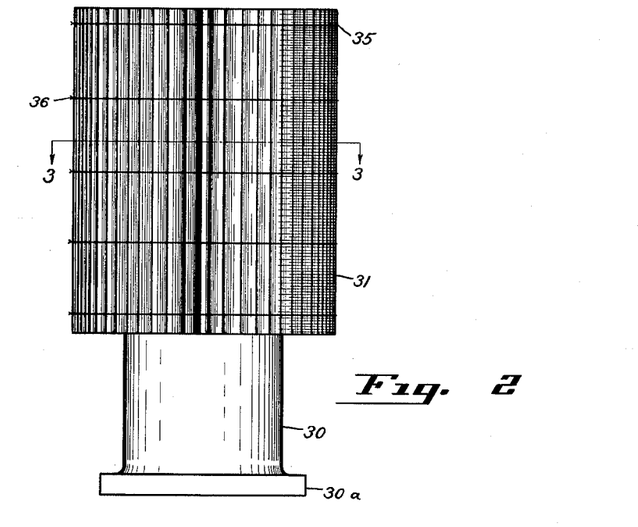
Fig. 2 is a side view showing the heat-dissipating or finning structure clamped to a cylinder ready for the furnace.

As illustrated in Fig. 1, after the shell has been thus prepared, it is ready to be assembled with the bonding metal, which is shown as a sheet or band of brazing brass or solder 34, and the sheet of fins 31. It will be seen that the thin fluxing hereinbefore described provides a layer of flux between the copper of the fins and the brazing solder 34, and between this band 34 and the outer surface of the engine cylinder. If desired, the flux might be applied on both sides of the brazing solder, but it is preferred to apply it on the cylinder and fins as before described.

The brazing solder 34 is in the form of a band, which is bent circumferentially around the cylinder, so that its two ends come together in proper position, and this preferably slightly overlapping. When sheet brass or brazing solder is employed as herein described, it has been found that the best results are obtained by using a brazing solder which contains about 62% of copper. This permits of heating the solder by a brazing heat which should not be so hot as to damage the fins, as would be the case where the melting point of the solder is too high. I do not limit myself, however, to the use of brass as a bonding metal, nor to a brass having the percentage of copper recited above. Silver solder can be employed to get good results as a bonding metal. It is important that the bonding metal selected should not have a melting point so high that in order to bring it into condition to form the proper bond, the assembly has to be heated so highly as to melt the copper of the fins. It is preferred to use a thin sheet of brass or other bonding metal and good results have been obtained by using a sheet in the neighborhood of 7 to 8 thousandths of an inch in thickness.

Around the sheet of solder is then placed the finning structure and the assembly secured in any suitable manner as by wires 35. In constructing a cylinder for an engine, the stroke of which is three and one half inches and the bore of the cylinder three and one half inches, it has been found satisfactory to use about five pieces of wire. This wire is preferably made of basic iron and good results have been obtained in the use of an iron wire about .078 of an inch thick. With large cylinders, it is preferred to use a heavier gauge of wire. The function of this wire is not merely to hold the assemblage in position during the heat-treating operation which follows, but it also serves as a pressure means to force the copper and brazing solder against the shell during the heat operation owing to the difference in the coefficient of expansion of the metal of the wire and the other metals of the assembly. Inasmuch as the heat-treatment causes an expansion of the copper finning which is resisted by the wire, the copper finning is forced against the brazing strip and the cylinder wall in the heat-treating operation.

7. *Fluxing the assembly.*

The assembly is now ready for what may be termed the second fluxing operation or thick fluxing, which consists in coating all the exposed surfaces of the copper fins with a heavy flux. Any suitable flux may be used, and the purpose of this flux is to protect the copper against undergoing changes in its physical condition during the brazing operation. It has been found that by the use of a flux of borax and boric acid, the copper fins, after they leave the furnace are in excellent condition and have not deteriorated, become burned, oxidized or brittle as a result of the heat to which they have been subjected. The use of such flux is particularly important in case there should be a reducing atmosphere in the furnace, which would tend to render the copper brittle. The preferred form of flux consists of a mixture of borax and boric acid in equal parts by weight diluted by water until the mixture has a specific gravity of about 1.300° at a temperature of 180° F. Care should be taken to maintain the flux at this temperature, because if it cools to any great extent, the ingredients settle out and become set and the flux cannot be used; therefore, once it has been made up, it should be maintained at the right temperature. Into this flux, the assembly is dipped, after which it is allowed to dry. The thickness of the flux may be varied depending upon the type of furnace employed. Where the furnace does not have a reducing or oxidizing atmosphere, the coating of flux need not be so heavy.

8. *Brazing operation.*

The heat treatment necessary to fuse the bonding metal and effect an integral coherent bond between the heat-dissipating or finning structure and the cylinder, may be applied in a gas oven, electric furnace, or other heating apparatus where products of combustion may be kept from the assembly, because it is particularly important that no products of combustion come in contact with the thin finning structure and the joint between it and the cylinder to which it is to be attached. Carrying out the bonding operation in an electric furnace has the advantage that temperatures can be more uniformly controlled than in a gas furnace; there are no products of combustion to interfere with the bonding operation; and the heat applied is radiant. A furnace which has been most successfully used in carrying out the process is one that is known in the trade as the Hoskins type FB #206 Hairpin resistor furnace.

During the heat treatment, the assembly should be maintained in position with the axis of the cylinder horizontal, and should be continuously rotated during the heat treatment and the rotation continued during cooling.

The heat treatment may be applied in a rotary furnace of the type described in patent to C. L. Lee, No. 1,445,220. In this furnace, products of combustion are substantially prevented from coming into contact with the finning structure and the exterior of the cylinder Should any small quantity of combustion gases escape into the atmosphere surrounding the assembly, they cannot produce any deleterious effect upon the thin finning structure because the exposed surfaces of said structure are coated with a protective flux, nor for the same reason, can the structure become oxidized.

It is desired to heat the assembly to a temperature at which the brazing solder will be in sufficiently fluid condition to flow into all the spaces between the fin structure and the iron cylinder shell, thereby to assist in forming a strong union with the adjacent copper and iron after the assembly has cooled. It is preferred to heat the assembly until it reaches a temperature at which the brazing solder will be in a liquid condition. This will be at a temperature above the melting point of the solder, but care should be exercised not to heat the assembly to a temperature at which the copper will begin to melt. Where the brazing solder contains in the neighborhood of 62% and 63% copper, I find that with a cylinder, brazing solder sheet, and finning of the dimensions and materials specifically referred to herein, good results are obtained by heating the assembly to a point where the temperature in the neighborhood of the union of the fins with the cylinder is about 1725° F. This temperature may be referred to as the final temperature, and when it is reached, the heat of the furnace is shut off, as the brazing solder at this temperature will be in the proper fluid condition, so that after cooling a satisfactory union will be effected between the copper finning and the cylinder. It will be understood that the final temperature of this furnace will depend upon the bonding material employed, as well as upon other factors. Where silver solder is employed as the bonding material, as described later, the final temperature will be lower. When the brazing solder is in a fluid condition, it alloys with, or intermingles with, the copper of the fin structure, and also alloys with or intermingles with, or penetrates into the iron. While the specific temperatures herein referred to have given good results in a furnace of the type described, it will be understood that these temperatures may vary.

The assembly may be maintained at the final temperature or at a point approximately the final temperature for as long as desired, but in such case the brazing must take place in a furnace in which the heat will not rise above the predetermined point, otherwise the cylinder will be overheated.

Owing to the fact that the brazing solder is brought to a fluid condition in the brazing operation, it becomes necessary to provide means for preventing the solder from flowing away from its position between the finning structure and the shell. It is also desirable to provide means for insuring an even distribution of heat throughout the walls of the engine cylinder. In the preferred form of the present invention the cylinder is inserted in the furnace with its axis horizontal, and the cylinder is rotated, oscillated, or otherwise moved in such a way that the tendency of the solder to flow out of its interposed position under gravity is resisted. This rotation of the assembly also insures an even distribution of the brazing solder between the shell and the fins when the solder is in fluid condition. The rotation or other movement imparted to the assembly should be continued during the brazing operation and the subsequent cooling operation until the brazing solder sets. The rotation of the cylinder prior to the melting and flowing of the brazing solder, as well as thereafter, insures that each and every part of the wall of the cylinder is subjected to substantially uniform heating in the furnace, notwithstanding the possibility of uneven temperature zones existing within the furnace. It is preferred that the rotation of the assembly should be relatively slow and in the practice heretofore followed the assembly has been rotated at a speed of about 16 to 18 revolutions per minute.

In the case of a gray iron cylinder of the dimensions hereinbefore referred to having a wall about 9/32 of an inch thick using copper finning fifteen thousandths of an inch thick, and a sheet of brass (62.5% copper) seven thousandths of an inch thick, it has been found that good results are obtained when the cylinder stays in the furnace about 14 minutes before reaching the final temperature, and during this period, the furnace should be rotated at a speed of about 16 to 18 revolutions per minute. The thick flux on the fins protects them from oxidation, notwithstanding the fact that the entire assembly is brought up to bright red heat.

Examination of the assembly during the heat treatment shows that the copper fins expand to such an extent that each fin bows or bends outwardly putting pressure on the bonding surface, and as the iron wires 35 are in contact with the outer surface of the fins along a well-distributed area, the base 33 of each fin is pressed firmly and with even pressure against the cylinder wall. The cylinder is allowed to cool slowly within the furnace without free access of air to the fins while rotating as hereinbefore described, after which it is cooled in the air.

9. Removal of flux and finishing.

The flux is removed in any suitable manner, for instance by boiling in a solution of so-called "Edis" compound after which it is dipped in a nitric acid bath to remove discoloration. The iron wires are removed and the cylinder finished by the usual operations of boring, machining, etc.

General considerations.

It will be appreciated from the above description of the brazing operation that the temperature conditions must be such that the brass is brought into the best condition for forming a bond with the cast iron and the copper fins, and that care should be taken that this bond shall be as uniform as possible, and should extend over substantially the entire area of the under surface of the finning structure. By conducting the heat operation in the manner described, sufficient heat is applied to bring the assembly up to the desired temperature, and sufficient time is given to enable the metals to become uniformly heated and bonded. The molten brazing solder unites with and coheres to the copper of the fins, and the iron is united with the contiguous metals which adhere to it.

Attempts have been made to shear off the metals of the union from a cylinder made in accordance with the process, and it has been found that the contiguous metals are bonded to the iron with a strength greater than the breaking strength of the contiguous brass and copper indicating the presence of a zone of cohesion intermediate the iron and the contiguous metals where the iron is combined or alloyed with the contiguous metals.

Examination of the union under a microscope indicates that any thin copper electroplating that may have been on the outside of the cylinder is absorbed by the molten brass.

Figure 8:
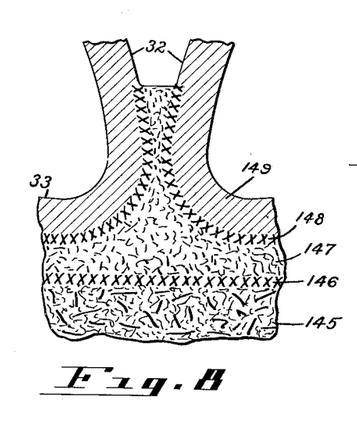
Fig. 8 is an enlarged view of a diagrammatic and exaggerated nature, showing in cross-section the bond between the finning structure and the cylinder wall.

A magnified cross section of the union between the cylinder and a fin is illustrated in Fig. 8, in which 145 represents the cast iron cylinder and 146 represents the zone of intermixture, alloying or cohesion between the iron and the brazing solder, 147 represents the zone of solder, 148 represents the zone of intermingling, alloying or cohesion between the solder and the copper of the finning structure, and 149 represents the substantially pure copper. The zones 146 and 148, are represented diagrammatically by the symbol xxxx and may not be as thick, relatively, as the drawing indicates. So far as I am able to ascertain these zones are present in the completed structure. But the dimensions and thicknesses are exaggerated for the sake of clearness, and are not intended to be accurately proportional. Microphotographs of sections of bonds produced by the hereindescribed process indicate that there is a progressive merging metallic path for the condition of heat from the iron to the cooper, and tests tend to show that true thermal connection exists between the fins and the iron. At least this union offers considerably less resistance to the passage of heat than would be the case in a junction where the copper fins are merely in contact with or adhesively held to the iron.

It will be noted from examination of Fig. 8 that the brazing solder has flown up between the edges of adjacent fins during the brazing operation as indicated at 150, bonding these fins together, thus strengthening the roots of adjacent fins. The bases of adjacent fins are thus each interconnected by the brazing solder alloyed therewith so that there is formed a continuous "skin" of heat conducting metal around the outside of the cylinder from which the roots 321 of the fins project and merge into the fins proper, the roots of these fins being preferably of greater thickness than double the thickness of the fins beyond the roots.

While it is desirable to have a continuous skin on the outside of the cylinder, as described above, as it permits of equalizing the distribution of heat in the outer surface of the cylinder, the invention is not limited to a bond between the fin and the engine cylinder which results in the formation of a "skin", as each fin might be affixed by a bond of the type described above without contacting with the adjacent fins. Moreover the contact between each fin and the engine cylinder may be and preferably is continuous, it may also be a series of short contacts. It will be noticed that the flow of heat takes place very readily from the inside of the cylinder shell to the fins; a relatively thin iron shell is preferably used, and the heat passes rapidly to the bond and passes relatively unimpeded over the zones 146, 147 and 148 into the copper 149 of the fins which are usually subjected to cooling air as hereinbefore described. The melting point of the brazing metal being higher than that attained in the normal operation of the engine, there will be no tendency for the fins to come off the cylinder in the operation of the engine due to the heat of engine operation, and tests extending over a considerable period indicate that no deteriorating action tending to weaken the bond takes place after rapid running of the engine for a considerable length of time, so that the attachment of the fins to the cylinder may be termed a permanent one. It will be found that the union between the fins and the engine cylinder is continuous not only circumferentially between adjacent fins, but also longitudinally between the shell and the fin. The mechanical strength of this union is such that if it is attempted to pull the fins off the cylinder of the dimensions heretofore described, they will break at a point in the copper and not at the point of junction.

Notwithstanding the fact that the cast iron is heated to a high temperature, it is not injured by the brazing operation. It will further be noticed that a large number of copper fins are employed, and that these fins are made of relatively thin copper; each fin is permanently attached to the cast iron cylinder by the intermediary of a heat conducting union which covers an extensive area of the cylinder compared with the cross sectional area of the fin.

Good results have been obtained by the use of a fin in which the height of the fin is in the neighborhood of about 70 times the thickness of the metal of the fin; the total number of fins employed and their height and length and distance apart are also preferably predetermined with the view of providing a very extensive heat dissipating surface. This extensive heat dissipating surface is obtained by employing a large number of thin copper fins separated by relatively small air spaces. In the embodiment of the invention shown in Fig. 6, sixty fin loops 32, providing in all one hundred and twenty fins 320 are shown. In practice it has been found advantageous to use about 12 fins per peripheral inch.

While the union of metals in accordance with the invention may be employed with any thickness of copper fins, I prefer nevertheless to use it with a thin fin such as described herein and having the advantages referred to.

Figure 3:
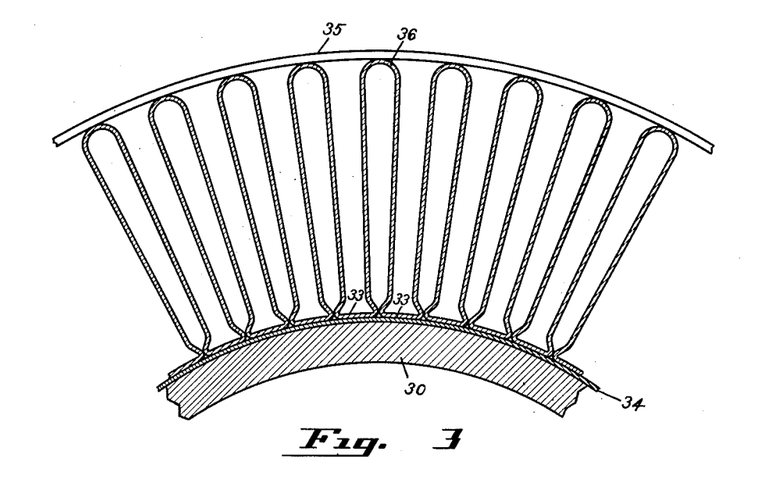
Fig. 3 is an enlarged cross section of a fragment on the line 3—3 of Fig. 2.

It will be noted by examination of the strip of finning illustrated in Figs. 1 and 3 that the fins are equidistantly separated and are folded so as to have the inner edges provided with a flat base produced by "flaring" the inner portions of the several folds or crimps as clearly shown. This form of fin, which may be termed a "flare edge" or "base-formed" fin, has been found to have decided advantages. It assists in uniformly spacing the fins apart, and it provides for more equal distribution of the air between the fins.

Figure 6:
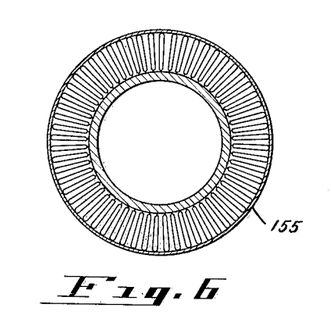
Fig. 6 is a cross sectional view taken through a cylinder made in accordance with the invention.
Figure 7:
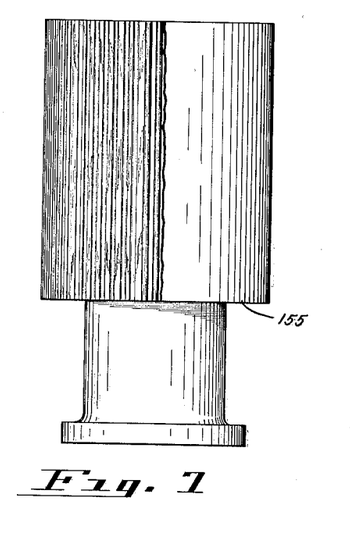
Fig. 7 shows the completed cylinder and part of a tube surrounding the finning structure.

The preferred form of fin or cooling element consists of a fold or fin loop of sheet metal forming a flattened tube having one edge attached to the cylinder wall. This tube is open at both ends and allows the passage therethrough of a draft of air, while an additional draft of air is caused to pass along the outside of the several fins by surrounding the entire fin structure with a sleeve indicated at 155. (Figs. 6 and 7.)

Referring to Figs. 9 and 10 which show a portion of a complete engine 156, it will be noticed that the cylinders 157 and finning 158 are surrounded by the draft tube 159 which merges into a head portion 160 leading into the inlet side of a fan 161 driven by the engine. Because of the large area of the heat dissipating fins, an efficient cooling of the engine takes place with the utilization of a fan which takes only a small proportion of power from the engine in order to provide a flow of cooling air sufficient to keep the cylinder efficiently cooled.

It will be observed that while the present process may be employed for bonding single fins, sections of fins, or all the fins simultaneously in a single operation, there is an advantage in bonding a complete finning structure to the cylinder in a single bonding operation, not only because it is more economical, but also because each fin is attached to the cylinder by substantially the same amount and thickness of bonding metals and the same kind of bond made under the same conditions as its neighbors, in other words, there will be substantial uniformity in the attachment of the fins and this makes for uniformity in the flow of heat into the fin in the running of the engine. I will also be noted that the attachment of the fins does not call for exceptionally skilled manual operations, so that the completed cylinders may be made in a factory under quantity production conditions such as exist in the automobile industry.

*Silver solder process.*

Instead of attaching the fins by brazing solder, as described above, I sometimes employ silver solder which also produces advantageous results in forming a union of the metals which will be satisfactory in practice. The process employed is, in the main, the same as that described above, the silver solder being used in the form of a band similar to the brazing solder band 34. The melting point of the silver solder, however, being less than the melting point of the brazing solder, the brazing operation in the furnace need not be carried out at so high a temperature with a silver solder, as is the case where brazing solder is employed. Good results have been obtained using silver solder containing about 44.42 silver, 39.46 copper and 16.12 zinc. The assembly is heated in the gas furnace until the silver solder is in fluid condition, and the heat of the furnace shut off when the temperature at the junction of two metals is in the neighborhood of 1650° F.

*Attaching fins to steel cylinders.*

The process of the invention as described above may be applied equally to the manufacture of a steel cylinder having copper fins attached thereto. The process for attaching copper fins for a copper finning structure to the steel cylinder is substantially the same as that described above with reference to cast iron cylinders. When the cylinder is made of steel it can be made much thinner than cast iron. For a cylinder having a bore of 3-1/2 inches and a stroke of 3-1/2 inches a suitable wall thickness will be about 5/64 of an inch.

Examination of the union between the steel and the copper fins shows that it has the same characteristics as the union between the cast iron cylinder and the copper fins and the cylinder presents similar desirable qualities in use.

*Eccentric finning process.*

The invention has been described above with reference to fins arranged concentrically around the engine cylinder, each fin being of the same dimensions as its neighbor. In constructing an engine utilizing cylinders in accordance with the present invention, it is found possible to reduce the length of the engine by arranging the cylinders in pairs with the inlet sides of the cylinders closer together than the outlet sides. Such an arrangement is shown in Fig. 9, wherein the inlet ports of the cylinder 157 are indicated at 162 and the exhaust ports 163. The valve structure is omitted in Fig. 9 for sake of clearness.

It has been found that the fins at the inlet sides of the cylinder need not provide so large a conducting area and so large a heat dissipating area as the fins on the outlet side of the cylinder, inasmuch as the inlet side of the cylinder is cooled by the incoming fuel mixture while the exhaust side of the cylinder is heated by the outgoing products of combustion. It thus becomes desirable to provide fins of a varying contour, which contour may be that indicated in Fig. 5, which shows an end elevation of the so-called eccentric finning structure 170 in the condition in which it leaves the finning machine, there being provided a series of short fins 171 to permit the cylinders to come close together, which short fins are located on the inlet side of the cylinder. The short fins 172 provide passage for the push rods for the valves. The fins 173 are shortened to reduce the distance between the adjacent pairs of cylinders. Such a finning structure may be assembled in the same manner as that above described for fins of even height and suitable spacing blocks provided to fill out to circular outline the assembly which may then be wired as before.

Stress is laid upon the desirability of applying even pressure to each of the fins, and causing even contact of each fin with the bonding material because the successful adhesion between the fin and the cylinder depends to a considerable extent upon the fin being pressed into contact with the cylinder by the wire during the heating.

While there has been described specifically a method of brazing copper fins of a particular form to a cast iron or steel cylinder, it is to be understood that the invention is not limited to these specific forms herein, which are the preferred ones and have given satisfactory results in practice. The examples of dimensions herein referred to, together with the specific types of apparatus employed are given herein by way of preference or examples, and not by way of limitation, as I believe it is novel in this art to attach a fin of copper to a cast iron, steel or other type of cylinder by a metallic union which is permanent, gives excellent thermal contact, is mechanically strong, and does not deteriorate substantially under running temperatures and running conditions of an internal combustion engine. The heat from the cylinder passes through the union from the iron to the copper without substantial obstruction, and the fin, being made of copper (which is almost nine times as good a conductor as iron), rapidly draws the heat out of the cylinder. This heat is withdrawn from the copper fins by the cooling air stream, and, owing to the large number of copper fins and their relatively large dimensions, the engine cylinder has a very large heat dissipating surface which increases its cooling efficiency to a marked degree as compared with the iron or steel fins common in this art.

The invention may also be found useful in connection with the brazing of copper and any heat exchange vessels which are subjected to conditions similar to those obtained in the interior of an engine. The term brazing metal as used in certain of the appended claims is intended to mean not only brass of a specific composition such as herein given, but any alloy or metal which can act in the same way as brass in effecting a union between the shell and the fins, which fins are not necessarily made of copper as any metal of high conductivity might be employed in place of copper.

While the invention has been described herein with reference to attaching copper fins, it is to be understood that it may apply to, and be employed equally advantageously in attaching fins of other suitable high conductive metals to the engine cylinder, and that while the engine cylinder is here described as being made of cast iron or steel, it may be made of other suitable metal without departing from the bounds of my invention, or the scope of the annexed claims.

The processes, apparatus and article herein shown and described constitute preferred embodiments of the invention, but it is to be understood that other forms might be adopted and changes made, all coming within the scope of the claims which follow.

What is claimed is as follows:

1. The process of bonding a non-ferrous metallic structure of high heat conductivity to a ferrous body, which consists in assembling the non-ferrous structure and the ferrous body with a layer of suitable bonding metal and suitable flux interposed between said structure and said body; coating the non-ferrous structure with a protective layer of flux, then heating the assembly to a red heat with the non-ferrous structure and adjacent surface of the body free from contact with products of combustion.

2. The process of bonding a non-ferrous metallic structure of high heat conductivity to a ferrous body, which consists in assembling the non-ferrous structure and the ferrous body with a layer of suitable bonding metal and suitable flux interposed between said structure and said body; dipping the entire assembly in a bath of flux to apply a protective layer to all parts of the assembly; then heating the assembly to a red heat.

3. The process of bonding a non-ferrous metallic structure of high heat conductivity to a cast iron body, which consists in assembling the non-ferrous structure and the cast iron body with a thin sheet of suitable bonding metal interposed between said structure and said body, and suitable flux between said sheet and structure and between said sheet and body; then heating the assembly to a red heat while keeping said non-ferrous structure and the adjacent surface of the body free from contact with products of combustion.

4. The process of bonding a copper structure to a cast iron body, which consists in assembling the copper structure and the cast iron body with a layer of suitable bonding metal and suitable flux interposed between said structure and said body; then heating the assembly to a red heat with the copper structure and adjacent cast iron surface free from contact with products of combustion.

5. The process of bonding a metallic heat-dissipating structure to a cylinder, which consists in assembling the heat-dissipating structure and the cylinder with a layer of suitable bonding metal and suitable flux interposed between said heat-dissipating structure and said cylinder, then heating the assembly to a temperature sufficient to liquefy the bonding metal and form a cohesive bond while constantly rotating the assembly about a substantially horizontal axis.

6. The process of bonding a heat-dissipating structure to a cylinder, which consists in assembling the heat-dissipating structure and the cylinder with a layer of suitable bonding metal and suitable flux interposed between said heat-dissipating structure and said cylinder, then heating the assembly to a temperature sufficient to liquefy the bonding metal while constantly rotating the assembly about a substantially horizontal axis, then cooling the assembly while continuing to rotate it.

7. The process of bonding a heat-dissipating structure to a cylinder which consists in assembling the heat-dissipating structure and the cylinder with a layer of suitable bonding metal and suitable flux interposed between said heat-dissipating structure and said cylinder, then heating the assembly to a temperature sufficient to liquefy the bonding metal while constantly rotating the assembly with the axis of the cylinder horizontal, around a substantially horizontal axis.

8. The process of bonding a metallic heat-dissipating structure to a cylinder or the like, which consists in assembling the heat-dissipating structure and the cylinder with a thin sheet of suitable bonding metal interposed, a layer of flux between the sheet and the cylinder, and between said sheet and said structure; then heating the assembly to a temperature sufficient to liquefy the bonding metal and form a cohesive bond.

9. The process of bonding a metallic heat-dissipating structure to a cylinder or the like, which consists in assembling the heat-dissipating structure and the cylinder with a layer of suitable bonding metal and suitable flux interposed between said heat-dissipating structure and said cylinder, pressing the heat-dissipating structure tightly to said cylinder, then heating the assembly to a temperature sufficient to liquefy the bonding metal and form a cohesive bond while still pressing the heat-dissipating structure to the cylinder.

10. The process of bonding a metallic heat-dissipating structure to a cylinder or the like, which consists in assembling the heat-dissipating structure and the cylinder with a layer of suitable bonding metal and suitable flux interposed between said heat-dissipating structure and said cylinder, clamping the heat-dissipating structure to the cylinder by bands of material having a lower coefficient of expansion than the heat-dissipating structure, then heating the assembly to a temperature sufficient to liquefy the bonding metal and form a cohesive bond.

11. The process of forming and bonding a metallic heat-dissipating structure to a cylinder or the like, which consists in pleating a thin sheet of high heat-conducting metal so as to form a plurality of properly spaced fin loops connected by plane connecting bases, wrapping said pleated sheet around the cylinder with an interposed layer of suitable bonding metal and suitable flux, temporarily fixing the heat-dissipating structure in place, then heating the assembly to a temperature sufficient to liquefy the bonding metal and form a coherent bond.

12. The process of forming and bonding a metallic heat-dissipating structure to a cylinder or the like, which consists in pleating a thin sheet of high heat-conducting metal so as to form a plurality of properly spaced fin loops connected by plane connecting bases, which are separated from each other, wrapping said pleated sheet around the cylinder so as to bring the separated bases into substantial juxtaposition with an interposed layer of suitable bonding metal and suitable flux, temporarily fixing the heat-dissipating structure in place, then heating the assembly to a temperature sufficient to liquefy the bonding metal and form a coherent bond.

13. The process of forming and bonding a metallic heat-dissipating structure to a cylinder or the like, which consists in pleating a thin sheet of high heat-conducting metal so as to form a plurality of properly spaced fin loops connected by plane connecting bases and having the inner edges of the side walls thereof inclined toward each other, wrapping said pleated sheet around the cylinder so as to bring the separated bases into substantial juxtaposition with an interposed layer of suitable bonding metal and suitable flux, temporarily fixing the heat-dissipating structure in place, then heating the assembly to a temperature sufficient to liquefy the bonding metal and form a coherent bond.

14. The process of forming and bonding a metallic heat-dissipating structure to a cylinder, which consists in pleating a thin sheet of high heat-conducting metal so as to form a plurality of properly spaced fin loops connected by plane connecting bases, wrapping said pleated sheet around the cylinder with an interposed layer of suitable bonding metal and with suitable flux between said layer and cylinder and said layer and heat-dissipating structure, temporarily securing together the assembled parts and heating the assembly to a temperature sufficient to liquefy the bonding metal and form a coherent bond.

15. The process of forming and bonding a heat-dissipating structure to a cylinder, which consists in forming a flexible finning structure in a straight length, having fins projecting therefrom, one group of adjacent fins varying in height in such order and degree that when the sheet is bent to form a cylinder the outer edges of the fins of said group will lie substantially in a common plane; wrapping said finning structure around the cylinder with suitable interposed bonding metal and flux, then heating the assembly to liquefy the bonding metal and form a coherent bond between the heat-dissipating structure and the cylinder.

16. The process of forming and bonding a heat-dissipating structure to a cylinder, which consists in forming a flexible finning structure in a straight length having fins projecting therefrom, at least one group of fins being of less height than the others, wrapping said finning structure around the cylinder with suitable interposed bonding metal and flux, fitting a filler block against the edges of the shorter fins, and temporarily bonding said heat-dissipating structure and block to the cylinder by metallic bands of lower coefficient of expansion than the heat-dissipating structure, said filler block being of such size and form that said bands contact with the edges of all fins except those covered by the block, then heating the assembly sufficiently to liquefy the bonding material and form a coherent bond.

17. The process of bonding a thin heat-dissipating structure to a cylinder or like body, which consists in assembling the thin heat-dissipating structure and the body with suitable bonding metal and flux, then applying radiant heat to the assembly sufficient to fuse the bonding metal and form a coherent bond, while protecting the thin heat-dissipating structure and the bonding metal from products of combustion and from oxidation.

In testimony whereof I hereto affix my signature.

CHARLES F. KETTERING.